United States Patent
Nishikata

[11] Patent Number: 5,793,720
[45] Date of Patent: Aug. 11, 1998

[54] OPTICAL DISK AND REPRODUCING APPARATUS INCLUDING A FOCUS SEARCH CONTROL DEVICE

[75] Inventor: Masanobu Nishikata, Tokyo, Japan

[73] Assignee: Sony Corporation, Tokyo, Japan

[21] Appl. No.: 748,414

[22] Filed: Nov. 13, 1996

Related U.S. Application Data

[62] Division of Ser. No. 557,626, Nov. 14, 1995.

[30] Foreign Application Priority Data

Nov. 16, 1994 [JP] Japan ................................... 6-306971

[51] Int. Cl.$^6$ ................................................ G11B 7/09
[52] U.S. Cl. ........................... 369/44.25; 369/44.29; 369/44.35; 369/94
[58] Field of Search ........................... 369/44.27, 44.25, 369/44.29, 44.35, 94, 275.1, 44.26, 54

[56] References Cited

U.S. PATENT DOCUMENTS

| | | |
|---|---|---|
| 5,060,215 | 10/1991 | Kawamura et al. ............... 369/44.35 |
| 5,263,011 | 11/1993 | Maeda et al. ...................... 369/44.27 |
| 5,408,453 | 4/1995 | Holtslag et al. ................... 369/94 |
| 5,428,597 | 6/1995 | Satoh et al. ....................... 369/94 |

FOREIGN PATENT DOCUMENTS 60-226029  11/1985  Japan.

*Primary Examiner*—Thang V. Tran
*Attorney, Agent, or Firm*—Frommer Lawrence & Haug LLP; William S. Frommer

[57] ABSTRACT

When an optical disk having a plurality of recording layers is loaded, in which layer-number data is recorded on the recording layer nearest to the signal reading plane and layer I.D. data is recorded on each recording layer, a pickup reads the data recorded on each recording layer. A focus error signal is produced by a quartered detector by using return light from the pickup. A focus search drive circuit generates a focus drive signal. When focalization on a desired recording layer is established during focus search by the focus search drive circuit, the focus search drive circuit is stopped.

2 Claims, 5 Drawing Sheets

Fig. 1
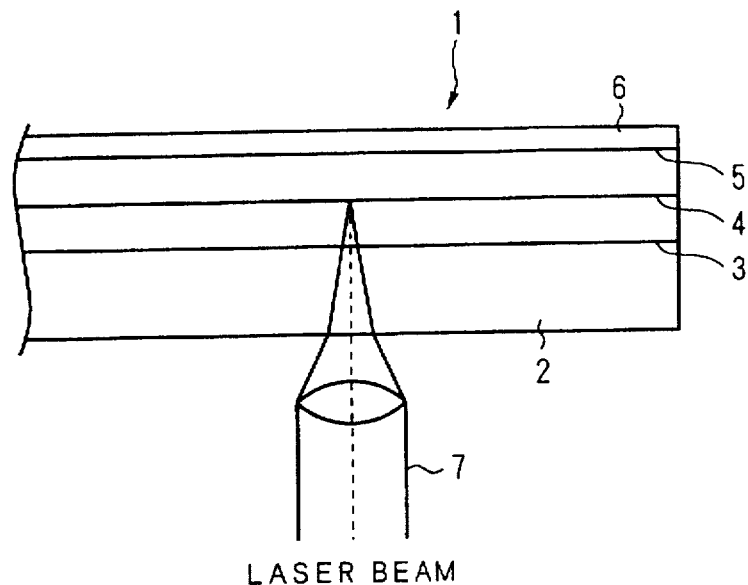
Fig. 3A
Fig. 3B
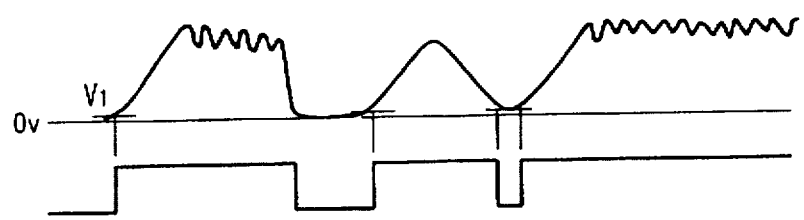
Fig. 3C
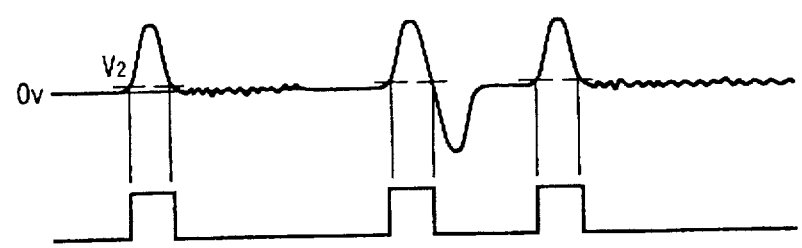
Fig. 3D
Fig. 3E

OPTICAL DISK AND REPRODUCING APPARATUS INCLUDING A FOCUS SEARCH CONTROL DEVICE

This application is a division of application Ser. No. 08/577.626, filed Nov. 14, 1995.

BACKGROUND OF THE INVENTION

1. Field of the Invention

This invention related to an optical disk on which digital data, for example, is recorded, and to a reproducing apparatus for reproducing the digital data recorded on such optical disks.

2. Description of the Prior Art

Already known are optical disks, on which digital image data is recorded. Also known are optical disk reproducing apparatuses for reading data recorded on such optical disks. Since data recorded on a disk is in digital form, the amount of information is enormous. It often occurs, therefore, that the entirety of a desired unit of data cannot be recorded on a single disk. In this connection, a multi-layered disk having a plurality of recording layers on a single disk has been proposed.

Upon reproducing data from an optical disk, the disk is rotated in a predetermined direction by a spindle motor after focus servo control and tracking servo control. Consequently, focus servo control is executed by moving an object lens in a pickup in a face-to-face relation with the disk so as to close the servo loop at the zero-cross of an S-shaped curve of a first detected focus error.

Also upon reproduction of a multi-layered disk, focus servo control and tracking servo control are executed. In case of multi-layered disks, focus servo control is done onto data on a layer nearest to the object lens. Therefore, it is impossible to know which layer is the currently reproduced layer. Also when the focus is jumped to a different layer due to a flaw or other trouble of a multi-layered disk during reproduction of a particular layer of the disk, the apparatus cannot discriminate whichever layer is to be reproduced, and henceforward reproduces the newly focused layer. Moreover, when a focus search or focus jump is executed to reproduce data on a next layer, it sometimes occurs that the object lens hits the disk and damages both the pickup and the disk. Further, if a multi-layered disk is reproduced under the misconception that it were a usual disk with a single layer, the reproducing operation stops at the end of reproduction of the first layer of the multi-layered disk.

OBJECTS AND SUMMARY OF THE INVENTION

It is therefore an object of the invention to provide an optical disk having a plurality of recording layers each bearing an identifying data indicating the ordinal number of the layer and to provide a reproducing apparatus capable of reproducing data from such optical disks.

According to an aspect of the invention, there is provided an optical disk including a plurality of recording layers, in which layer-number data indicating the number of recording layers is recorded on one of the recording layers nearest to a reading plane.

According to further aspect of the invention, there is provided a reproducing apparatus for reproducing data from an optical disk having a plurality of recording layers, comprising a pickup for reading data on said optical disk and having focus control means; a quartered detector 11 for generating a focus error signal by using return light from the pickup; a focus search drive circuit 19 for generating a focus drive signal to be applied to the focus control means; and a CPU 24 which receives the focus error signal generated during focus search by the focus search drive circuit 19 to stop the focus search when focalization onto pre-selected one of the recording layers is established.

When an optical disk having a plurality of recording layers is loaded, firstly the sub-code R is read out from the first recording layer which is the nearest layer to a signal, reading plane. In this case, the focus search driving circuit 19 is used. Recorded on the sub-code R of the first recording layer is a data indicating the number of layers of the loaded optical disk. Also recorded on the sub-code S of each recording layer is a data indicating the ordinal I.D. number of the layer starting from the first recording layer. A search command (the I.D. number of a recording layer to be accessed) is read, then the focus search starts and the focusing zero-cross is detected. The zero-cross detection signal is supplied to the CPU 24. When focalization is changed from a recording layer to another, the sub-code S on the latter recording layer is read. At the trailing edge of the zero-cross detection signal of a desired layer, the focus search drive circuit 19 stops its operation.

The above, and other, objects, features and advantage of the present invention will become readily apparent from the following detailed description thereof which is to be read in connection with the accompanying drawings.

BRIEF DESCRIPTION OF THE DRAWINGS

FIG. 1 is a side elevation of a multi-layered optical disk;

FIGS. 3A, 3B, 3C, 3D and 3E are waveform diagrams of signals output from respective circuits in the optical disk reproducing apparatus upon focalization onto a second layer of an optical disk having three recording layers;

DETAILED DESCRIPTION OF THE PREFERRED EMBODIMENTS

Figure 2:
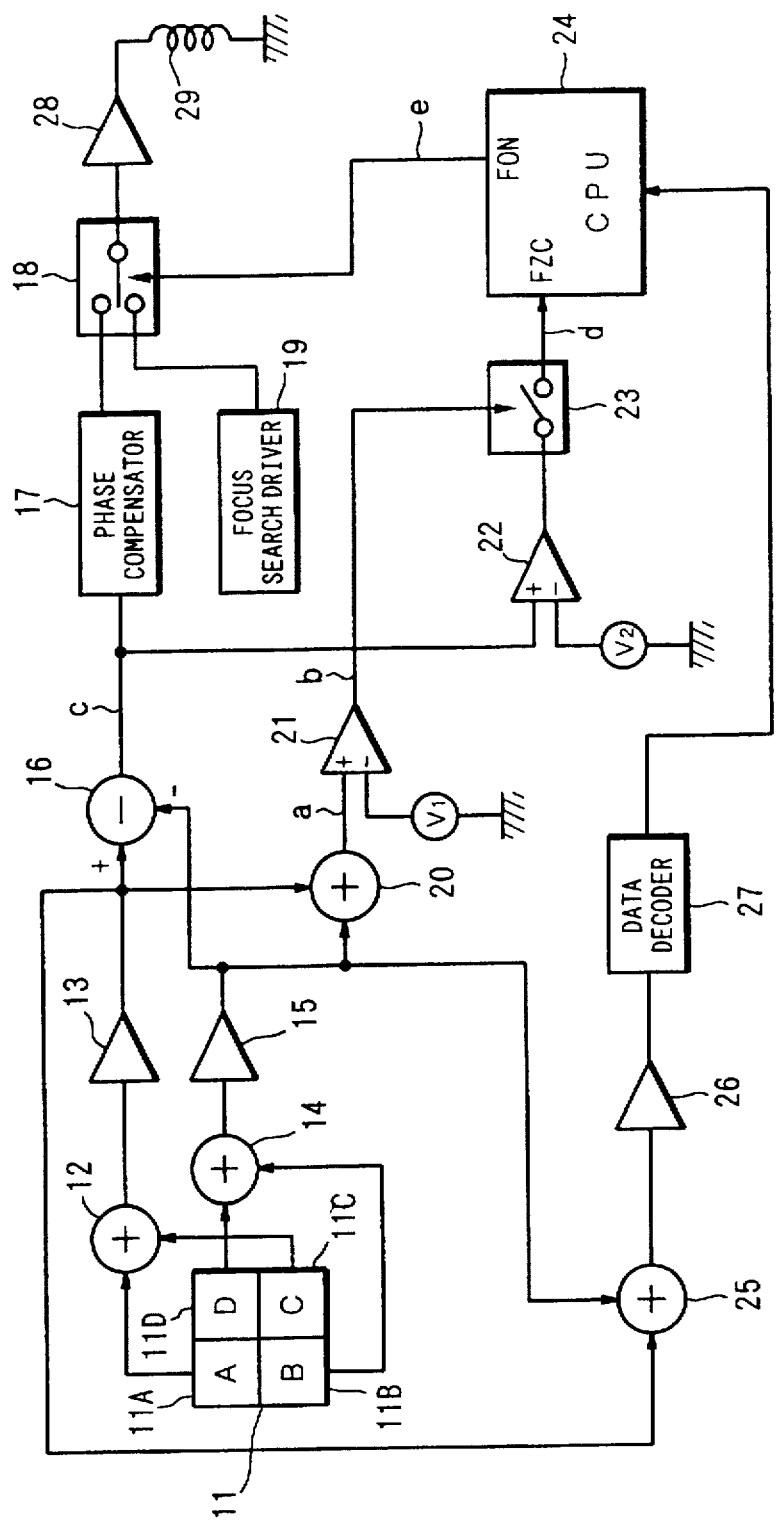
FIG. 2 is a block diagram of a reproducing apparatus for reproducing multi-layered optical disks.

An embodiment of the invention is described below with reference to the drawings. FIG. 1 is a side elevation of an optical disk having a plurality (three) of recording layers. Each recording layer has recorded digital data. The optical disk 1 comprises a substrate 2, first recording layer 3, second recording layer 4, third recording layer 5 and protective layer 6. In this example, laser light from a pickup 7 is irradiating the second recording layer 4.

Assume here that the recording format of the optical disk 1 is the same as that of a compact disk, for example. Recorded on the sub-code R in the sub-code area of the first recording layer 3 is a data regarding the number of recording layers the optical disk 1 has. Since the optical disk 1 shown in FIG. 1 has three recording layers, layer-number data "3", is recorded on the sub-code R of the first recording layer 3. If the optical disks has a single recording layer, then such layer-number data is not recorded. Referring to this data, the number of recording layers of the optical disk loaded can be known.

Regarding focalization, the light is focused to the first recording layer by executing focus-servo control onto a first S curve of a focus error signal. Then the sub-code R having recorded the layer-number data is read out. Thus, focus servo control can be executed for an intended layer with no problem.

Layer I.D. data indicating the ordinal number of the layer is recorded on the sub-code S in the sub-code area of each recording layer. In the optical disk 1 shown in FIG. 1, "1" is recorded on the sub-code S of the first recording layer 3, "2" on the sub-code area S of the second recording layer 4, and "3" on the sub-code area S of the third recording layer 5. If the optical disk 1 has only recording layer, then such layer I.D. data is not recorded. Referring to the data, the layer I.D. number of the layer of the optical disk currently reproduced can be known. Even when the laser light jumps from a currently reproduced layer to another due to a flaw or other default on the optical disk, the jump from one layer to another can be readily known by reading the sub-code S including the layer I.D. number. The areas used for recording layer-number data and layer I.D. data need not be the areas of the sub-code R and sub-codes S. Instead, other sub-code areas may be used for recording such data. In the foregoing description, ordinal numbers are assigned starting from the recording layer nearest to the pickup; however, the numbers may be started from the recording layer remotest from the pick up.

FIG. 2 is a block diagram of a reproducing apparatus for reproducing a multi-layered disk. Numeral 11 denotes a quartered detector comprising four detectors (11A, 11B, 11C and 11D). The quartered detector 11 detects whether an irradiated laser beam is exactly focalized on the optical disk. Detection signals of the detectors 11A and 11C are supplied to an adder 12, and those of the detectors 11B and 11D to an adder 14. The added signal (A+C) output from the adder 12 is supplied to a subtracter 16, adder 20 and adder 25 via an amplifier 13. The sum signal (B+D) output from the adder 14 is supplied to a subtracter 16, adder 20 and adder 25 via an amplifier 15. Supplied from the subtracter 16 is a ((A+C)-(B+D)) signal as a focus error signal (signal c) sent to a phase compensation circuit 17 and one of input terminals of a comparator 22. Applied to the other terminal of the comparator 22 is a reference signal $V_2$. The comparator 22 executes zero-cross detection, and outputs the detection signal to a switch 23 when the focus error signal is not exceeded by the reference signal $V_2$.

The focus error signal, phase-compensated by the phase compensation circuit 17, is supplied to one of selective terminals of a switch 18. Supplied to the other selective terminal of the switch 18 is a focus search drive voltage from a focus search drive circuit 19 having a predetermined characteristic. When the output signal of the phase compensation circuit 17 is selected, it is determined that focalization on the optical disk is established. On the other hand, when the output signal of the focus search drive circuit 19 is selected, it is determined that the beam is not focalized on the optical disk. An object lens mounted in a pickup is moved by the signal output from the focus search drive circuit 19. In the initial state, the focus drive circuit 19 is selected by the switch 18.

A reproduction RF signal (A+B+C+D) (signal a) output from the adder 20 is supplied to one of input terminals of a comparator 21. Applied to the other input terminal of the comparator 21 is a reference signal level $V_1$. The comparator 21 compares the reproduction RF signal level with the reference signal level $V_1$. When the reproduction RF signal level is not exceeded by the reference signal level $V_1$, a focus OK signal (signal b) indicating focalization being proper is output to a switch 23 as a control signal. When the switch 23 is turned on, a zero-cross detection signal (signal d) output from the comparator 22 is supplied to a CPU 24. The CPU 24 detects the trailing edge of the zero-cross detection signal.

The adder 25 generates a reproduction RF signal (A+B+C+D) and supplies it to a data decoder 27 via an amplifier 26. The signal decoded by the decoder 27 is output to the CPU 24 as a sub-code data. As referred to above, recorded on the sub-code R is the data indicating how many recording layers the optical disk has. Recorded on each sub-code S is the layer I.D. data indicating the ordinal number of the layer.

CPU 24 generates a focus ON signal (signal e) only at the trailing edge of the zero-cross detection signal. The focus ON signal is supplied to the switch 18 as a control signal to have the switch 18 select the phase compensation circuit 17. The signal selected by the switch 18 is sent through a drive amplifier 28 to a focus drive coil 29 having one end connected to ground.

FIGS. 3A, 3B, 3C, 3D and 3E are waveform diagrams of signals output from respective circuits in the optical disk reproducing apparatus. Explained below is a process for focalization on a second recording layer of an optical disk having three recording layers. The reproduction RF signal (signal a) is supplied from the adder 20 to the comparator 21. The comparator 21 is also supplied with the reference signal $V_1$ (see FIG. 3A). If the reproduction RF signal is not exceeded by the reference signal $V_1$, the focus OK signal (signal b) (see FIG. 3B) output from the comparator 21 represents the high level (hereinafter called H level), and it is output to the switch 23. The switch 23 is turned on only during the focus OK signal being supplied. Supplied to the comparator 22 is the focus error signal (signal c) output from the subtracter 16 and the reference signal $V_2$ (see FIG. 3C). The signal through the switch 23 (zero-cross detection signal output from the comparator 22; signal d) is supplied to the CPU 24 (see FIG. 3D). CPU 24 generates the focus ON signal at the trailing edge of the focus zero-cross detection signal, and supplies it to the switch 18. When the focus ON signal is supplied, the switch 18 selects the output signal of the phase compensation circuit 17.

Explained below is FIGS. 3A, 3B, 3C, 3D and 3E from the view point of timing. Focus search is started at time H. The focus ON signal is changed to H level at the trailing edge (time I) of the zero cross detection signal, and it is output from CPU 24 to the switch 18. At this time, focalization meets on the first recording layer of the optical disk loaded. The layer-number data recorded on the sub-code R of the first recording layer is read out to detect the number of recording layers of the optical disk. At time J, the focus OK signal is changed to the low level (hereinafter called L level). Accordingly, the focus ON signal is changed to L level. From the time on, focus search of the second recording layer is started. When the light is focused on the second recording layer at time K, the focus ON signal is changed to H level at the trailing edge of the zero-cross detection signal, and it is supplied to the switch 18. At this time, layer data recorded on the sub-code S of the second recording layer is read out.

Figure 4:
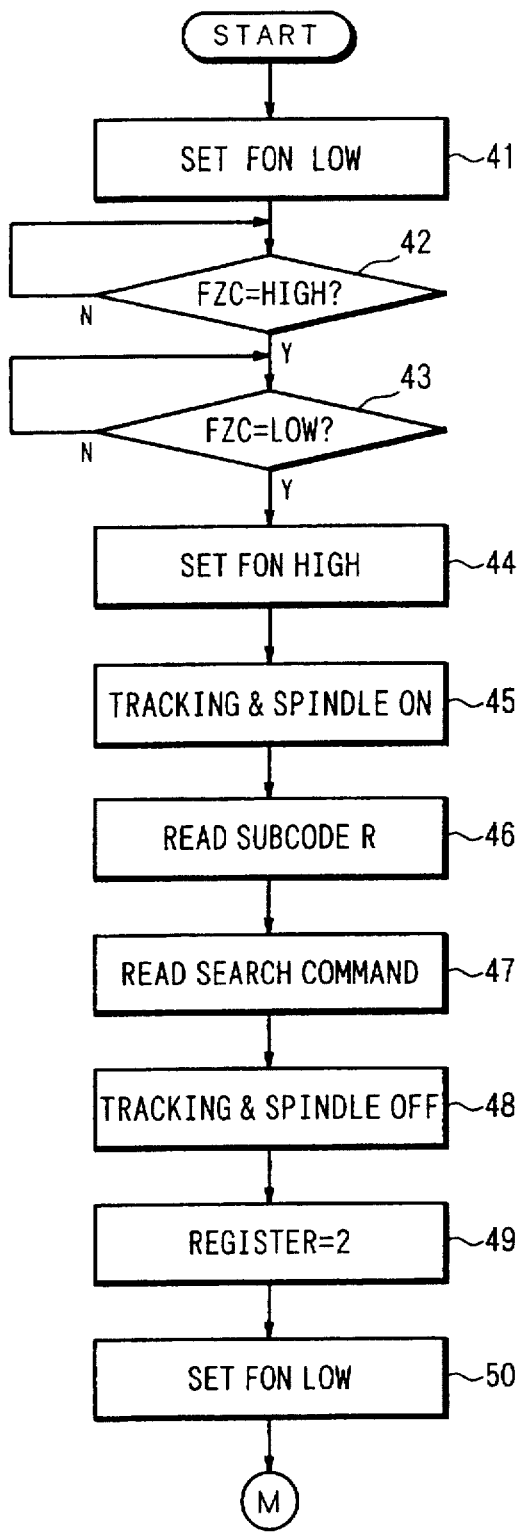
FIG. 4 is a flow chart of the process for focalization of a second layer of an optical disk having three recording layers.
Figure 5:
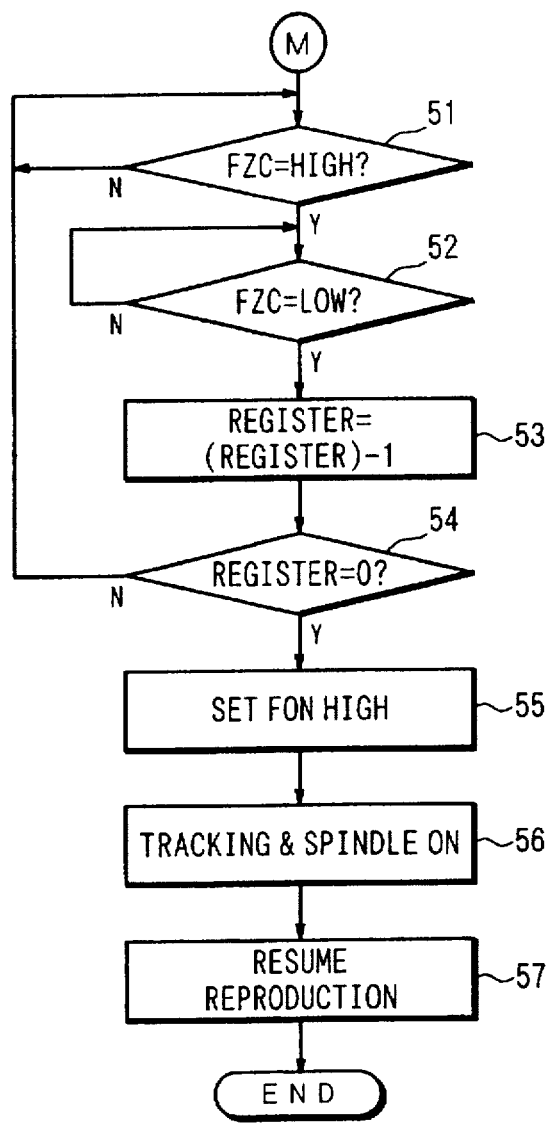
FIG. 5 is a flow chart of the process for focalization of a second layer of an optical disk having three recording layers.

FIGS. 4 and 5 are a flow chart of a process for focalization on the second recording layer of the optical disk having three recording layers. To start focus search, the focus ON signal is changed to L level in step 41. In step 42 and step 43, the state of the zero-cross detection signal is referred to. That is, it is determined whether the zero-cross signal has changed from H level to L level. When the zero-cross detection signal is deemed to have changed to L level, the focus ON signal is changed to H level at the trailing edge of the zero-cross detection signal (step 44). At this time, focus servo control is executed on the first recording layer. In step 45, after tracking for the first recording layer is turned ON, the spindle motor is activated. Thus the loaded optical disk is rotated in a predetermined direction.

Then, in step 46, the layer-number data recorded on the sub-code R of the first layer is read out to detect the number of recording layers the optical disk has (in this example, the optical disk is recognized to have three recording layers). When the number of recording layers is known, a command (for example, "search of a chapter on the second layer") preliminarily input through a remote controller, or the like, is read (step 47), and the tracking and spindle motor are turned OFF (step 48).

Since the command instructs access to the second recording layer in this example, "2" is stored in a register (for example, register A) in CPU (step 49). This is the number of occurrence of the zero-cross detection signal to be counted. After that, the focus ON signal is changed to L level, focus search is started (step 50). In step 51 and step 52, the state of the zero-cross detection signal is referred to. That is, it is determined whether the zero-cross detection signal has changed from H level to L level. When the zero-cross signal is found to have changed to L level, the count number of the zero-cross signal is decremented (step 53). In step 54, it is judged whether the count number of zero-cross detection signals has become zero. That is, it is determined whether the zero cross-detection signal has been detected twice after the count number was set as 2. If it is judged that the zero-cross detection signal has not been detected twice, the process returns step 51. On the other hand, when it is judged that the zero-cross detection signal has been detected twice, the process goes to step 55.

In step 55, the focus ON signal is changed to H level. Thus established is focalization onto the second recording layer. In step 56, after tracking is adjusted, the optical disk is rotated in a predetermined direction by the spindle motor. Then the second recording layer is reproduced (step 57).

Figure 6:
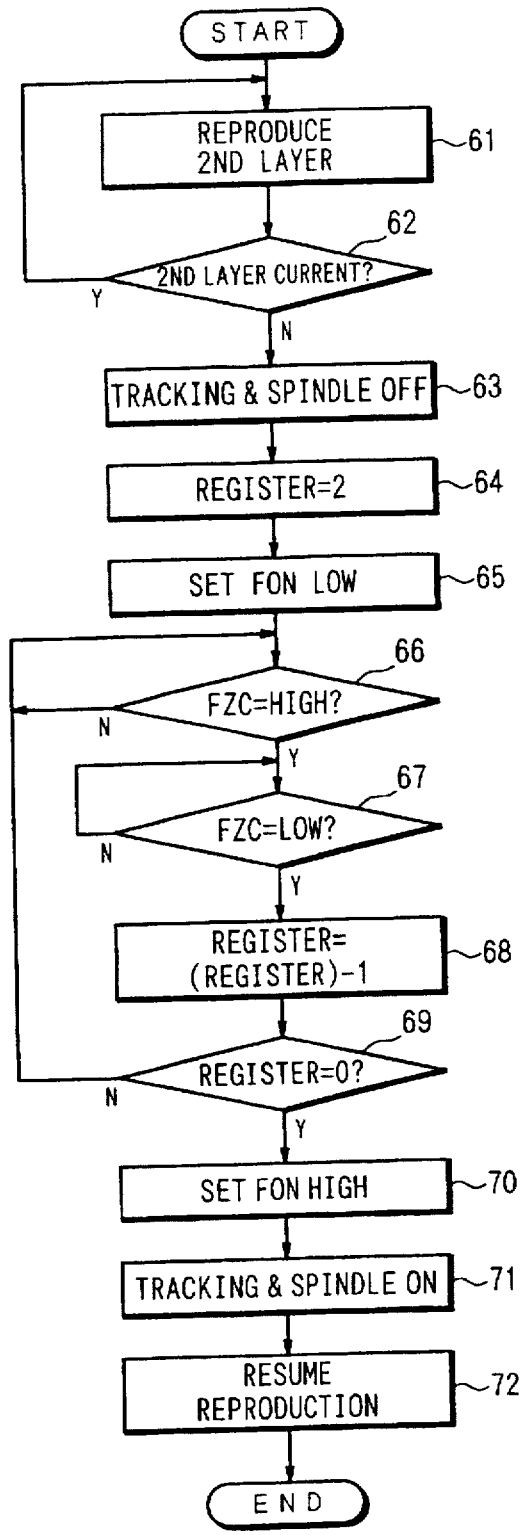
FIG. 6 is a flow chart of the process for returning a deviated focus to an original recording layer.

FIG. 6 is a flow chart of a process for returning the focus to a proper recording layer from another recording layer to which it accidentally jumped. Such focus jump is caused by flaws, or the like, on the optical disk as explained before. In step 61, the second recording layer is reproduced. If a focus jump occurred during this reproduction, the laser beam is focused to the first or second layer. In step 62, it is judged whether the currently reproduced layer is the second layer or not. If it is the second layer, then the process returns to step 61. If it is not the second layer, then the process goes to step 63. In step 63, tracking and the spindle motor are inactivated.

Since the second recording layer has been accessed in this example, the register (for example, register A) in CPU stores "2". This value of the register is read out (step 64). After that, the focus ON signal is changed to L level, focus search is started (step 65). Then the object lens starts moving from the initial position. In step 66 and step 67, it is judged whether the zero-cross detection signal has changed from H level to L level. If the zero-cross detection signal is found to have changed to L level, the count number of the zero-cross detection signal stored in the register is decremented (step 68). In step 69, it is judged whether the count number stored in the register has changed to 0 or not. That is, it is judged whether the zero-cross detection signal has been detected twice after the layer under current reproduction is found to be other than the second layer. If it is judged that the zero-cross detection signal has not been detected twice, the process returns to 66. On the other hand, if the zero-cross detection signal is found to have been detected twice, the process goes to step 70.

In step 70, the focus ON signal is changed to H level. Thus established is focalization onto the second recording layer. After tracking is adjusted (step 71), the optical disk is rotated in a predetermined direction by the spindle motor, and reproduction of the digital data recorded on the second recording layer is resumed (step 72).

According to the invention, the optical disk has layer I.D. data each indicating the ordinal number of each recording layer and recorded on each recording layer, and has layer-number data indicating the number of recording layers and recorded on the first recording layer. It can be known, therefore, which layer is currently reproduced. Even when the focus jumps to a wrong layer due to a flaw, etc. on the disk, it can be immediately returned to a proper layer because the currently reproduced layer can be identified. Moreover, since the layer-number data and the layer I.D. data are known, focus search and focus jump can be executed reliably.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An optical disk reproducing apparatus, comprising:
    a pickup for reading recorded data from an optical disk;
    focus error signal generating means for generating a focus error signal from light read out by said pickup;
    focus search means for supplying a focus drive signal to said pickup to perform a focus search;
    detector means for detecting a desired recording layer in response to said focus error signal, wherein said detector means comprises:
        zero-cross detector means for detecting the zero-cross of said focus error signal; and
        counter means for counting the occurrences of detection of said zero cross;
    control means for stopping the supply of said focus drive signal in response to a detection signal from said detector means;
    storage means for storing a layer number of a layer currently reproduced;
    first comparator means for comparing a layer number reproduced after a focus jump with said layer number stored in said storage means; and
    second comparator means for performing said focus search when the result of said comparison exhibits non-coincidence and for comparing said layer number stored in said storage means with the occurrences of detection of the zero-cross of the focus error signal such that said control means is further operable to stop the supply of said focus drive signal when the result of said comparison by said second comparator means exhibits coincidence.

2. An optical disk reproducing method, comprising the steps of:
    supplying a focus drive signal to said pickup to perform a focus search;

detecting a recording layer number in response to a focus error signal by detecting the zero-cross of said focus error signal, and counting the occurrences of detection of said zero-cross;

stopping the supply of said focus drive signal when the detected recording layer number coincides with a desired layer number;

storing a layer number of a layer currently reproduced;

comparing a layer number reproduced after a focus jump with the stored layer number;

performing a focus jump when the result of the comparison exhibits non-coincidence;

comparing the stored layer number with the occurrences of detection of the zero-cross of the focus error signal; and stopping the supply of the focus drive signal when the result of the comparison of the stored layer number with the occurrences of detection of the zero-cross of the focus error signal exhibits coincidence.

* * * * *